(12) United States Patent
Panda et al.

(10) Patent No.: US 11,586,596 B2
(45) Date of Patent: Feb. 21, 2023

(54) METHODS AND SYSTEMS FOR HIERARCHICAL DYNAMIC CATALOGING

(71) Applicant: Tata Consultancy Services Limited, Mumbai (IN)

(72) Inventors: Satanik Panda, Kolkata (IN); Dibyendu Biswas, Kolkata (IN); Hemanta Dutta, Kolkata (IN); Tanushyam Chattopadhyay, Kolkata (IN); Prateep Misra, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 599 days.

(21) Appl. No.: 16/596,986

(22) Filed: Oct. 9, 2019

(65) Prior Publication Data
US 2020/0151153 A1 May 14, 2020

(30) Foreign Application Priority Data
Oct. 5, 2018 (IN) .............................. 201821037825

(51) Int. Cl.
*G06F 16/00* (2019.01)
*G06F 16/21* (2019.01)
(Continued)

(52) U.S. Cl.
CPC ........ *G06F 16/211* (2019.01); *G06F 16/2365* (2019.01); *G06F 16/282* (2019.01);
(Continued)

(58) Field of Classification Search
CPC .................. G06F 16/211; G06F 16/282; G06F 16/2365; G06F 16/289
See application file for complete search history.

(56) References Cited

U.S. PATENT DOCUMENTS

| 4,945,475 A | 7/1990 | Bruffey et al. |
| 5,675,806 A | 10/1997 | Takada et al. |

(Continued)

FOREIGN PATENT DOCUMENTS

CN 101470741 7/2009

OTHER PUBLICATIONS

Batory, Don, and Sean O'malley. "The design and implementation of hierarchical software systems with reusable components." ACM Transactions on Software Engineering and Methodology (TOSEM) 1.4 (1992): 355-398.*

(Continued)

*Primary Examiner* — Nan Hutton
(74) *Attorney, Agent, or Firm* — Finnegan, Henderson, Farabow, Garrett & Dunner LLP

(57) ABSTRACT

Data cataloging has become a necessity for empowering organizations with analytical ability. Conventional cataloging systems may fail to provide proper visualization of data to the different stakeholders of an organization. The present disclosure provides a hierarchical dynamic cataloging system so that visualization of data at different levels would be possible for different stake holders. In the present disclosure, a hierarchical structure of algorithms and multiple stake holders along with relevant metadata is generated. Further, a catalog is generated by performing a mapping across components comprised in the hierarchical structure and identifying relationship across the components based on mapping. The catalog gets dynamically updated and provides a dynamic view of the algorithms and associated metadata to the multiple stakeholders of an organization. Further, the disclosure supports reuse of already developed algorithms across multiple applications and domains resulting in optimization of resources and time.

11 Claims, 7 Drawing Sheets

(51) Int. Cl.
  *G06F 16/28* (2019.01)
  *G06Q 10/105* (2023.01)
  *G06N 20/00* (2019.01)
  *G06F 16/23* (2019.01)

(52) U.S. Cl.
  CPC ........... *G06F 16/289* (2019.01); *G06N 20/00* (2019.01); *G06Q 10/105* (2013.01)

(56) References Cited

U.S. PATENT DOCUMENTS

| | | | |
|---|---|---|---|
| 5,721,911 | A | 2/1998 | Ha et al. |
| 6,572,556 | B2 | 6/2003 | Stoycos et al. |
| 9,461,876 | B2 * | 10/2016 | Van Dusen ........ G06Q 30/0201 |
| 2001/0016846 | A1 | 8/2001 | Chakrabarti et al. |
| 2002/0069080 | A1 | 6/2002 | Roy et al. |
| 2007/0192082 | A1 * | 8/2007 | Gaos ...................... G06F 9/455 |
| | | | 703/27 |
| 2013/0325867 | A1 * | 12/2013 | Kemmler ................ G06F 16/21 |
| | | | 707/E17.046 |
| 2019/0171438 | A1 * | 6/2019 | Franchitti ............. G06F 16/903 |

OTHER PUBLICATIONS

Tichy, Walter F. "A catalogue of general-purpose software design patterns." Proceedings of TOOLS USA 97. International Conference on Technology of Object Oriented Systems and Languages. IEEE, 1997.*

Kotthoff, L. "Ranking Algorithms by Performance" retrieved from https://arxiv.org/pdf/1311.4319.pdf (15 pages).

* cited by examiner

METHODS AND SYSTEMS FOR HIERARCHICAL DYNAMIC CATALOGING

PRIORITY CLAIM

This U.S. patent application claims priority under 35 U.S.C. § 119 to Indian Application No. 2018210378251, filed on Oct. 10, 2018. The entire contents of the aforementioned application are incorporated herein by reference.

TECHNICAL FIELD

The disclosure herein generally relates to field of cataloging, more particularly, to methods and systems for hierarchical dynamic cataloging.

BACKGROUND

The rapid development in technology requires industries to provide a gradual combination of traditional manufacturing and industrial practices. This may include utilizing platforms such as large-scale Machine-to-Machine (M2M) and Internet of Things (IoT) deployments. These platforms may help manufacturers and consumers by providing increased automation, improved communication and monitoring, along with self-diagnosis and new levels of analysis to provide a truly productive future. Analytics is one of the major pillars for serving this purpose in organizations.

Analytics as a service on top of any platform such as IoT helps in empowering organizations with analytics capability. Among the various types of analytical services, IoT analytical services requires the involvement of multiple stake holders. Analytical modules of organizations for providing analytical services should be visualized in such a manner that they can add some value for the customer in terms of ease of use. Conventional systems may fail to provide proper visualization of analytics modules to different stakeholders within, or outside of organization.

SUMMARY

Embodiments of the present disclosure present technological improvements as solutions to one or more of the above-mentioned technical problems recognized by the inventors in conventional systems. For example, in one aspect, there is provided a processor implemented method, comprising receiving a plurality of inputs and metadata associated with each of the plurality of inputs from one or more stakeholders pertaining to one or more applications; generating a hierarchical structure of the plurality of inputs and the one or more stake holders pertaining to the one or more applications. In an embodiment, the one or more components comprised in the hierarchical structure comprise a plurality of algorithms, a plurality of machine learning models, a plurality of execution platforms and information pertaining to one or more stakeholders.

In an embodiment, the method further comprising performing a mapping across the plurality of inputs received from the one or more stakeholders based on the hierarchical structure to identify relationship between one or more components specified in one or more applications; generating a catalog based on the identified relationship; receiving an incoming request from one or more users; determining, based on the incoming request, a change in one or more attributes defining the hierarchical structure comprised in the catalog; dynamically updating the catalog based on the change in one or more attributes defining the hierarchical structure; and enabling, based on the dynamically updated catalog, reusability of at least one of the plurality of inputs and the one or more components for the incoming request.

In an embodiment, the method further comprising providing a dynamic view of the algorithms and stakeholders by dynamically updating the catalog in case of any changes in the inputs and the relationship.

In an embodiment, the method further comprising creating a zero coding dynamic algorithm for an application by enabling reusability of a plurality of modules associated with other applications.

In another aspect, there is provided a system comprising: a memory storing instructions; one or more communication interfaces; and one or more hardware processors coupled to the memory through the one or more communication interfaces, wherein the one or more hardware processors are configured by the instructions to receive a plurality of inputs and metadata associated with each of the plurality of inputs from one or more stakeholders pertaining to one or more applications; generate a hierarchical structure of the plurality of inputs and the one or more stake holders pertaining to the one or more applications. In an embodiment, the one or more components comprised in the hierarchical structure comprise a plurality of algorithms, a plurality of machine learning models, a plurality of execution platforms and information pertaining to one or more stakeholders.

In an embodiment, the one or more hardware processors are further configured by the instructions to perform a mapping across the plurality of inputs received from the one or more stakeholders based on the hierarchical structure to identify relationship between one or more components specified in one or more applications; generate a catalog based on the identified relationship; receive an incoming request from one or more users; determine, based on the incoming request, a change in one or more attributes defining the hierarchical structure comprised in the catalog; dynamically update the catalog based on the change in one or more attributes defining the hierarchical structure; and enable, based on the dynamically updated catalog, reusability of at least one of the plurality of inputs and the one or more components for the incoming request. In an embodiment, the one or more hardware processors are further configured by the instructions to provide a dynamic view of the algorithms and stakeholders by dynamically updating the catalog in case of any changes in the inputs and the relationship.

In an embodiment, the one or more hardware processors are further configured by the instructions to create a zero coding dynamic algorithm for an application by enabling reusability of a plurality of modules associated with other applications.

In yet another aspect, there are provided one or more non-transitory machine readable information storage mediums comprising one or more instructions which when executed by one or more hardware processors cause receiving a plurality of inputs and metadata associated with each of the plurality of inputs from one or more stakeholders pertaining to one or more applications; generating a hierarchical structure of the plurality of inputs and the one or more stake holders pertaining to the one or more applications. In an embodiment, the one or more components comprised in the hierarchical structure comprise a plurality of algorithms, a plurality of machine learning models, a plurality of execution platforms and information pertaining to one or more stakeholders.

In an embodiment, the one or more non-transitory machine readable information storage mediums comprising one or more instructions which when executed by one or more hardware processors may further cause performing a mapping across the plurality of inputs received from the one or more stakeholders based on the hierarchical structure to identify relationship between one or more components specified in one or more applications; generating a catalog based on the identified relationship; receiving an incoming request from one or more users; determining, based on the incoming request, a change in one or more attributes defining the hierarchical structure comprised in the catalog; dynamically updating the catalog based on the change in one or more attributes defining the hierarchical structure; and enabling, based on the dynamically updated catalog, reusability of at least one of the plurality of inputs and the one or more components for the incoming request. In an embodiment, the one or more non-transitory machine readable information storage mediums comprising one or more instructions which when executed by one or more hardware processors may further cause providing a dynamic view of the algorithms and stakeholders by dynamically updating the catalog in case of any changes in the inputs and the relationship.

In an embodiment, the one or more non-transitory machine readable information storage mediums comprising one or more instructions which when executed by one or more hardware processors may further cause creating a zero coding dynamic algorithm for an application by enabling reusability of a plurality of modules associated with other applications.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
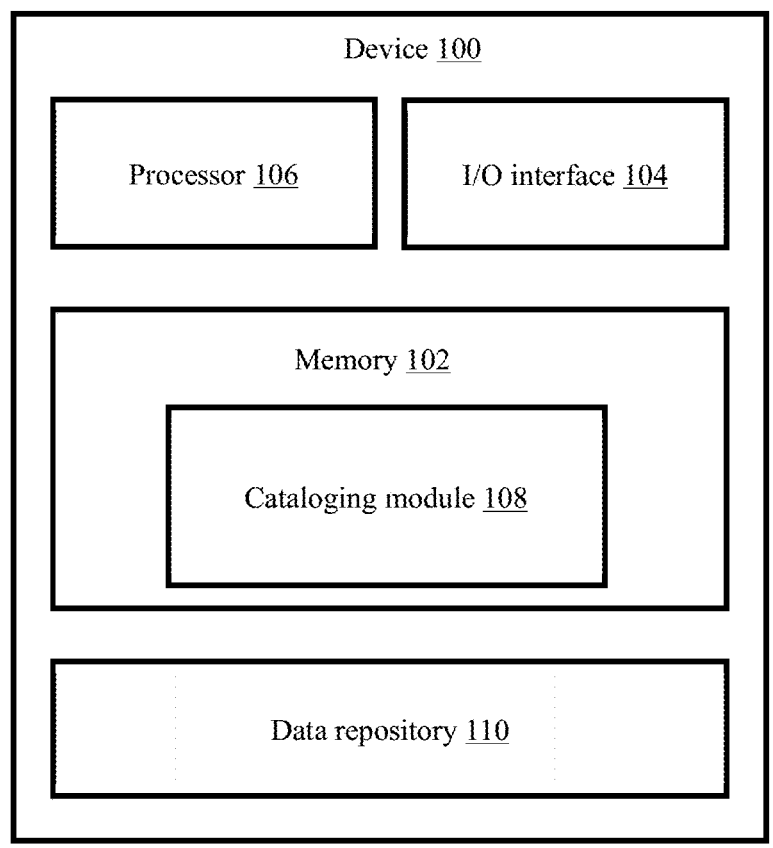
FIG. 1 illustrates a functional block diagram of a system (device) for hierarchical dynamic cataloging, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide methods and systems for hierarchical dynamic cataloging. Typical way of visualization of set of algorithms pertaining to different platforms such as IoT platform performed by conventional systems has been modified by providing a hierarchical and dynamic cataloging system. The present disclosure proposes a cataloging mechanism for set of algorithms associated with different modules of an organization in a hierarchical manner so that the different levels of visualization is possible for different stake holders within, or outside of organization. In other words, a cataloguing service for one or more scenarios is provided that support multiple views and expose basic modules in multi layers of abstraction where each layer can access the contents of lower level by setting parameters of stitching multiple blocks under the bottom. These layers of abstractions are named as: Domain, Project, Tasks, Modules, and the like. In an embodiment, the one or more scenarios may include but not limited to analytics as a service scenario. Further, the disclosure can facilitate the ingestion of a plurality of algorithms from one or more sources at a time and provide a dynamic view of the plurality of algorithms and one or more stakeholders associated with application(s) or domain(s). Furthermore, the disclosure supports reusability of already developed set of algorithms across multiple applications and domains resulting in optimization of time and resources during application development.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates a functional block diagram of a system for hierarchical dynamic cataloging, according to some embodiments of the present disclosure. The system 100 includes or is otherwise in communication with one or more hardware processors such as a processor 106, an I/O interface 104, at least one memory such as a memory 102, and a cataloging module 108. In an embodiment, the cataloging module 108 can be implemented as a standalone unit in the system 100. In another embodiment, the cataloging module 108 can be implemented as a module in the memory 102. The processor 106, the I/O interface 104, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The hardware processor 106 may be implemented as one or more microprocessors, microcomputers, microcontrollers, digital signal processors, central processing units, state machines, logic circuitries, and/or any devices that manipulate signals based on operational instructions. Among other capabilities, the hardware processor 106 is configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes the plurality of modules 108 and a repository 110 for storing data processed, received, and generated by one or more of the modules 108. The modules 108 may include routines, programs, objects, components, data structures, and so on, which perform particular tasks or implement particular abstract data types.

The data repository 110, amongst other things, includes a system database and other data. The other data may include data generated as a result of the execution of one or more modules in the modules 108. The system database stores a plurality of input data and metadata associated with each of the plurality of input data. The system data base also stores a hierarchical structure and a catalogue which are generated as a result of the execution of one or more modules in the module 108. The data stored in system database can be learnt to further provide an updated database.

In an embodiment, the catalog module 108 can be configured to generate a hierarchical dynamic catalog of a plurality of algorithms and one or more stakeholders involved in development of one or more applications (e.g., IoT based analytical application development). Generation of hierarchical dynamic catalog can be carried out by using methodology, described in conjunction with FIG. 2 and use case examples.

Figure 2:
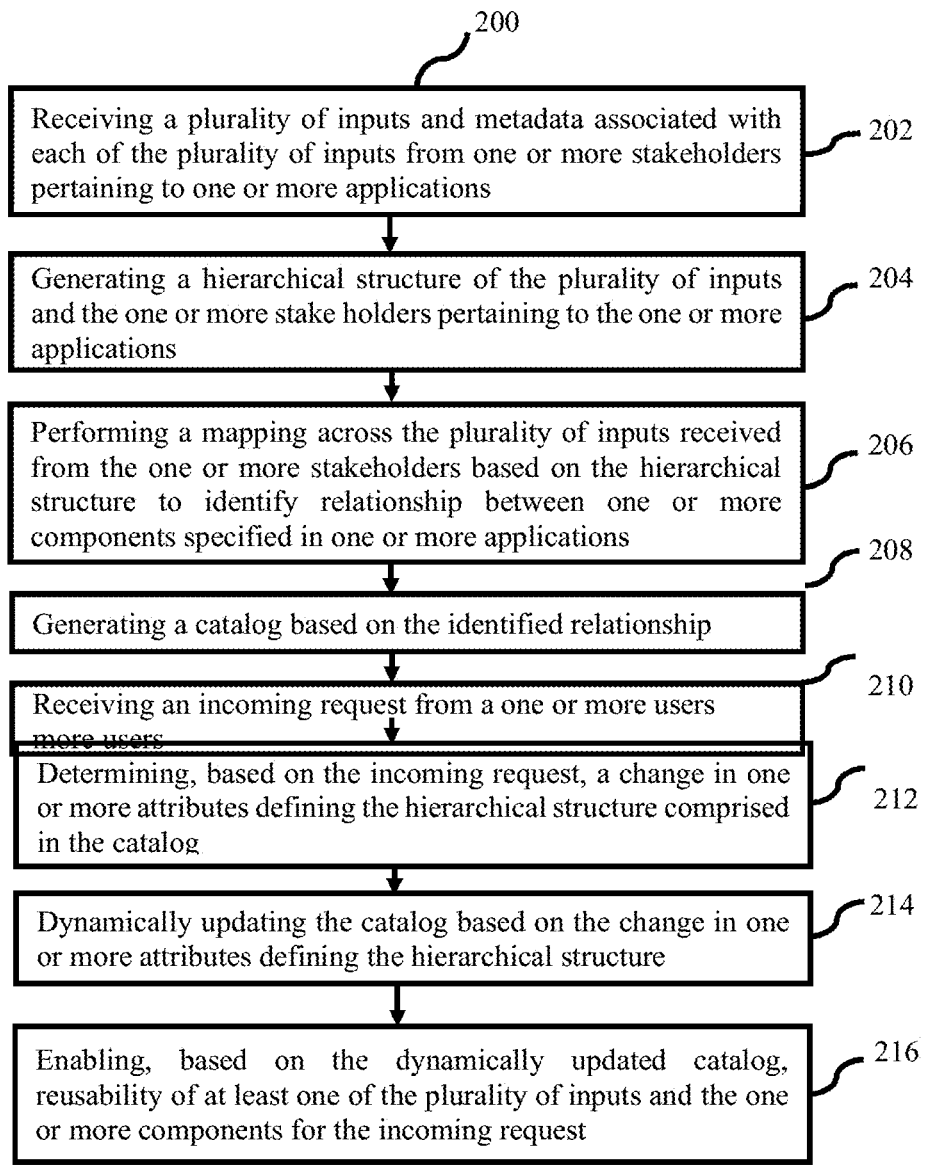
FIG. 2 illustrates an exemplary flow diagram of a processor implemented method for hierarchical dynamic cataloging, in accordance with some embodiments of the present disclosure.

FIG. 2, with reference to FIG. 1, is an exemplary flow diagram of a processor implemented method for hierarchical dynamic cataloging using the cataloging module 108 of FIG. 1, in accordance with some embodiments of the present disclosure. In an embodiment of the present disclosure, at step 202 of FIG. 2, the one or more hardware processors 106 receive a plurality of inputs and metadata associated with each of the plurality of inputs from one or more stakeholders pertaining to one or more applications. In an embodiment, the inputs may comprise but not limited to, algorithms, functions, source codes, configuration scripts, domain knowledge, and the like. In an embodiment, the metadata associated with each of the plurality of inputs may include, but is not limited to, different hyper parameters (e.g., input parameters, output parameters, processing parameters and the like) associated with the plurality of algorithms, a use case for which the algorithm is developed, and a domain of the algorithm (e.g., banking domain, manufacturing domain, insurance and the like). In an embodiment, the one or more stakeholders could be scientists and researchers who are involved in algorithm development, customized workflow developer, workflow approvers, Intellectual property professionals, domain specific administrators, domain specialist, business unit heads, module leads, project leads, managers, end users, clients and the like. In an embodiment, the one or more applications could be but not limited to an IoT based analytical application, banking application(s), finance application(s), an insurance like analytics application. In an embodiment, the one or more applications can belong to same domain or different domains. For example, application such as IoT based analytical application can belong to same domain (e.g., manufacturing domain) or can belong to different domains (e.g., manufacturing domain and signal processing domain). In another embodiment, the plurality of input data is received for one or more tasks to be performed for each application from the one or more applications.

Referring back to FIG. 2, at step 204, a hierarchical structure of the plurality of inputs and the one or more stake holders pertaining to the one or more applications is generated. In an embodiment, the hierarchical structure of the one or more stakeholders is generated due to different responsibilities assumed or taken up by different stakeholders. For instance, responsibilities of one of the stakeholder such as scientist, researcher and algorithm developer involved in developing algorithms may include (i) creating, updating, and deleting algorithms, (ii) maintaining versions of algorithms, and (iii) performing segregation of algorithms into different types such as descriptive, diagnostic, predictive or prognostic, prescriptive, generic, and the like. However, responsibilities of the another stakeholder (e.g., administrator) may include (i) creating, updating and deleting end users, (ii) creating, updating, and deleting domains, (iii) assigning domain to user, and (iv) verifying and approving algorithms submitted by scientists. In a similar way, there may exist yet another stakeholder say end user, clients and the like. The responsibility of end users may include (i) creating, updating and deleting a project, and (ii) viewing approved algorithms.

In an embodiment, the hierarchical structure further comprises of one or more components specified in the one or more applications. In another embodiment, the one or more components comprised in the hierarchical structure may include a plurality of algorithms, a plurality of machine learning models, a plurality of execution platforms and information pertaining to one or more stakeholders. In an embodiment, the plurality of algorithms comprised in the hierarchical structure are received from algorithm developers, scientists and researchers working on the one or more tasks to be performed (or executed) by the one or more applications of either a specific domain or different domain(s). For example, algorithms could be developed for one or more applications related to only one domain say signal processing domain or more than one domain say signal processing domain and manufacturing domain. In an embodiment, the plurality of algorithms could be segregated as prescriptive algorithm, diagnostic algorithm, descriptive algorithm, predictive algorithm, prognostic algorithm, and the like. In an embodiment, the prescriptive algorithms used for analytics depict a report, a graph or a statistical representation, and provide recommendation for selecting best course of action. The prescriptive algorithm helps in predicting the time of occurrence of a failure which may occur in future along with the root-cause behind the failure. In an embodiment, the diagnostic algorithms depict step-by-step methods for making a diagnosis using a combination of symptoms, signs, or test results. The diagnostic algorithms can also be used to come up with possible diagnoses in order of their likelihood. In an embodiment, the descriptive algorithms used for analytics depict a preliminary stage of data processing that creates a summary of historical data to yield useful information and possibly prepare the data for further analysis. In an embodiment, the predictive algorithms used for analytics encompasses a variety of statistical techniques from data mining, predictive modelling, and machine learning to analyse current and historical facts. Based on the variety of statistical techniques, the predictive algorithms help in making predictions about future or otherwise unknown events. In an embodiment, the prognostic algorithms depict an engineering field that aims at predicting the future state of a system. The prognostics algorithms may help in improving the process of scheduling maintenance, ordering parts, and using resources.

In another embodiment, the algorithms can be structured in a hierarchy based on a layer of abstractions arranged in a chronological order. The layer of abstractions arranged in a chronological order could be but not limited to domains, projects, tasks, and modules. For example, in a domain (say manufacturing domain), one of the project to be worked on could be optimizing the operating cost of any production line. The one or more tasks associated with the project could be building a model for cost parameters and their distribution over input values which is followed by a recommendation engine (stored in memory 102). The recommendation engine determines correlation of the input parameters over the cost. By training the model built for cost parameters and their distribution over input values, point of minimization of cost can be predicted and output can be maximized. Eventually, an operative recommendation can guide a line operator to operate inside a boundary to ensure optimum cost verses output. In this way, the layer of abstractions could be arranged in an order of domain, project, tasks, module and the like. In an embodiment, the information pertaining to one or more stakeholders comprised in the hierarchical structure may comprise but not limited to knowledge of domain experts, strategies of business unit heads and the like. In an embodiment, the hierarchical structure is generated based on a criterion, wherein the criterion is decided based on the user requirements, business needs and target execution platforms deployed for the one or more applications. Further, a plurality of algorithms which satisfy the application specific criteria are selected and arranged in a hierarchical manner. For example, based on client requirements, if a particular domain requires to use prescriptive algorithms for a particular application, then the prescriptive algorithms are arranged on the top of the hierarchical structure. In an embodiment, the target execution platforms could be but not limited to a cloud platform or edge platform.

In an embodiment, the step of generating hierarchical structure is preceded by a pre-processing and a verification step. The pre-processing step includes tuning of the hyper-parameters associated with the plurality of algorithms developed for one or more application of a specific domain or different domains based user requirement. For instance, scientists or researchers from different labs create algorithms by providing full metadata including code, input parameters, processing, output parameters and files. Further, based on the user requirement, the value of hyper parameters involved in the algorithms can be tuned. Upon performing the pre-processing step, the plurality of algorithms are provided to another stakeholder (e.g., administrator) for verification and approval. The verification step is performed to check for plagiarism and errors. In case of positive verification, another stakeholder (e.g., administrator) approves the plurality of algorithms and metadata associated with each of the algorithm(s) and make the plurality of algorithms visible to the users. Otherwise, the administrator can disapprove the plurality of algorithms and metadata associated with each of the algorithm which do not qualify verification step and send it back to scientists and researchers for further updating. In an embodiment, further updating due to disapproval leads to creation of multiple versions of the plurality of algorithms and associated metadata.

Referring back to FIG. 2, at step 206, a mapping across the plurality of inputs received from the one or more stakeholders is performed based on the hierarchical structure to identify relationship between one or more components specified in one or more applications. Mapping across the plurality of inputs is performed by utilizing knowledge bases of domain expertise(s). For example, in a domain (say manufacturing domain), one of the task under consideration is determining remaining useful life (RUL). The input for the set of algorithms associated with manufacturing domain for determining RUL may include but not limited to machine parameters such as spindle load, motor speed and the like. Same task of determining RUL can be exist in other domains such as life science domain and the like. But, in other domains, say for life science domain, the remaining useful life is determined for heart. The input for the set of algorithms associated with life science domain for determining RUL may include but not limited to parameters such as ECG signal, EEG signal and the like. The same algorithm for determining RUL problem which is utilized in manufacturing domain can work for life science domain by change of input and adjusting the configuration. However, there is no change in the code utilized in the algorithm. In another embodiment, there is a possibility that algorithm experts across the research units and academic institutes may provide codes depicting similar algorithm which can further be utilized across multiple business areas. In such cases, the mapping is performed between the available resources with the client requirement. In an embodiment, different clients can have different requirement which may be solved based on similar algorithm sets but with different hyper parameters. Moreover, sometimes multiple analytical modules can be used to solve a similar problem, even within same domain or across different domains. So, the mapping is performed to identify relationship between the one or more components specified in the one or more applications. The step of performing mapping and identifying relationship is further explained by way of a non-limiting example. In the non-limiting example, it is considered that a scientist from one of the research lab working on a machine efficiency measurement problem has developed an algorithm to determine status of machine based on a set of parameters. For example, the set of parameters could be but not limited spindle load, servo load, and feed data. Further, the developed algorithms along with a sample program and sample input output data gets submitted to an administrator for verification. In a similar way, another scientist creates an algorithm named as 'machine break' to determine probability of machine breakdown based on machine status and submits the algorithm along with the associated metadata to the administrator for verification. Post positive verification, algorithms received from both the scientists gets approved by the administrator. Upon receiving approval from admin (or administrator), a hierarchical structure of the algorithms is created based on nature of the algorithm and layer of abstraction. Further, a mapping is performed to identify a relationship between one or more components specified in one or more applications. In this case, application seems to be smart factory analysis and one or more components are parameters used for machine efficiency measurement and machine breakdown probability determination. So a mapping is performed across parameters used for machine efficiency measurement and machine breakdown probability determination which seems to machine status. So the relationship identified between algorithms used for machine efficiency measurement and machine breakdown probability determination is machine status which is common in both the case.

Further, at step 208 of the FIG. 2, a catalog is generated based on the identified relationship. The catalog comprises the hierarchical listing of the algorithms with the associated metadata developed for performing one or more task pertaining to one or more applications in a specific domain or across domains. In case of above mentioned example of performing task of machine efficiency measurement and machine breakdown probability determination, based on the hierarchical structure of the algorithms, the type of algorithms (e.g., prescriptive, predictive, prognostic, descriptive, diagnostic) applicable to the task is determined. Further, determining machine status is identified as one of the common component in both the tasks (e.g., machine efficiency measurement and machine breakdown probability determination). So the type of algorithms utilized for determining machine status are analysed for both the task and common characteristics between the utilized algorithms are identified as relationship and utilized for generating a catalog specific to a domain (say manufacturing domain in this case). However, the generated catalog can also incorporate information extracted based on relationships identified across multiple domains.

Referring back to FIG. 2, at step 210, the one or more processor receive an incoming request from one or more users. In an embodiment, the one or more user could be but limited to an end user, a client, a scientist, a domain expert, a researchers, and the like. The incoming request could be but not limited to a request for developing an algorithm based on client requirements or business needs. For example, an incoming request could be developing an anomaly detection algorithm along with some constraints (say cluttered environment) specific to a particular application, wherein the application could be but not limited to heart rate anomaly detection, anomaly detection in driving behaviour, anomaly detection in machine and the like. Further, as depicted in step 212 of FIG. 2, based on the incoming request, it is determined whether there is a change in one or more attributes defining the hierarchical structure comprised in the catalog. In an embodiment, the one or more attributes could be the plurality of algorithms and associated metadata, input parameters, output parameters, execution platforms, type of machine learning model used, functions, source codes, scripts and the like. In an embodiment, change may refer to change in the type of algorithms employed for previous user requests in a particular domain but not matching the requirement of incoming request belonging to the same domain. For example, it is assumed that a scientist had been working in manufacturing domain and utilizing descriptive algorithms for performing one or more tasks related to the same domain. Suppose, for a new incoming request, he needs to utilize diagnostics algorithms instead of the descriptive algorithms. So based on the new incoming request, a change is determined. Based on the change, the hyper parameters of the previously utilized algorithms are tuned to a value that can match with the current requirements. Further, as depicted in step 214 of FIG. 2, the catalog is dynamically updated based on the change in one or more attributes defining the hierarchical structure. The determined changed gets learnt by the system which results in dynamic updation of the catalog. In an embodiment, the one or more attributes defining the hierarchical structure may comprise but not limited to domain information (e.g., type of domain say manufacturing domain), input parameters, output parameters and processing parameters associated with the plurality of algorithms, machine learning models, and execution platforms (e.g., cloud, edge) and the like. In an embodiment, the one or more processors provide a dynamic view of the algorithms and stakeholders by dynamically updating the catalog in case of any changes in the inputs and the relationship. For example, for a specific domain (e.g., machine analysis domain), a scientist utilizes a descriptive algorithm with a plurality of input and output parameters and processing parameters, machine learning models, and execution platform for deploying the application. Upon administrator's approval, the algorithms becomes visible to all the users working in the same domain. Further, the scientist changes the algorithms from descriptive to prognostic. The change gets learnt by the system and the catalog gets dynamically updated based on the change resulting in change in the algorithms visible to the user. Thus, in case of any changes in the inputs and the relationship, the catalog gets dynamically updated and provides a dynamic view of algorithms to the user.

Referring back to FIG. 2, at step 214, the one or more processors enable reusability of at least one of the plurality of inputs and the one or more components for the incoming request based on the dynamically updated catalog. For example, in previously considered case of machine efficiency measurement and machine breakdown probability determination, both the respective scientists submits their algorithms. Among all the algorithms submitted by both scientists, algorithm provided for performing a task of machine status determination is common. Even though, same algorithm is utilized for both the tasks, scientists have put individual efforts in developing it. This results in wastage of resources and time. For instance, if a domain user from Manufacturing ISU wants to create a Remaining useful Life (RUL) algorithm for a machine which is cutting some metal as part of a project he is working in. In this case, the domain user checks in the catalog portal and look for the existing algorithms in the catalog portal to create RUL as an end result. The domain user views both the approved algorithm with the metadata and input output files. Then he used them to define his RUL algorithms by connecting both of them together inside his project by adjusting the input and tuning parameters as needed by RUL. Thus, the proposed disclosure enables reusability of already developed algorithms by the one or more stakeholders pertaining to one application by the one or more stakeholders of another application. In an embodiment, the one or more processors may support creating a zero coding dynamic algorithm for an application by enabling reusability of a plurality of modules associated with other applications. The zero coding dynamic algorithm refers to applying an algorithm used in one application to another application with no changes in the codes and scripts utilized in the algorithm. For example, in a domain (say manufacturing domain), one of the task under consideration is determining remaining useful life (RUL). The input for the set of algorithms associated with manufacturing domain for determining RUL may include but not limited to machine parameters such as spindle load, motor speed and the like. Same task of determining RUL can be exist in other domains such as life science domain and the like. But, in other domains, say for life science domain, the remaining useful life is determined for heart. The input for the set of algorithms associated with life science domain for determining RUL may include but not limited to parameters such as electrocardiogram (ECG) signal, electroencephalogram (EEG) signal and the like. The same algorithm for determining RUL problem which is utilized in manufacturing domain can work for life science domain by change of input and adjusting the configuration. However, there is no change in the code utilized in the algorithm.

The proposed disclosure provides customized workflow development, wherein a new algorithm can be developed to accomplish some specific task by stitching a proper subset of the existing modules and existing algorithms. For example, a task of anomaly detection in heart has to be performed. For performing task of anomaly detection in heart, an algorithm for heart related feature extraction, and a classification algorithm may be required. However, the feature extraction algorithm and classification might already be developed as a subset for some other tasks such as heart rate monitoring. So, the existing feature extraction algorithm and classification algorithms can be stitched to perform task of anomaly detection in heart. The disclosure allows a domain expert to visualize all projects associated to multiple clients within a business area and thus enable him to create a quick prototype for a previously unseen problem. The present invention provides optimization of resources and time by enabling reusability of existing algorithms for different applications.

Figure 3:
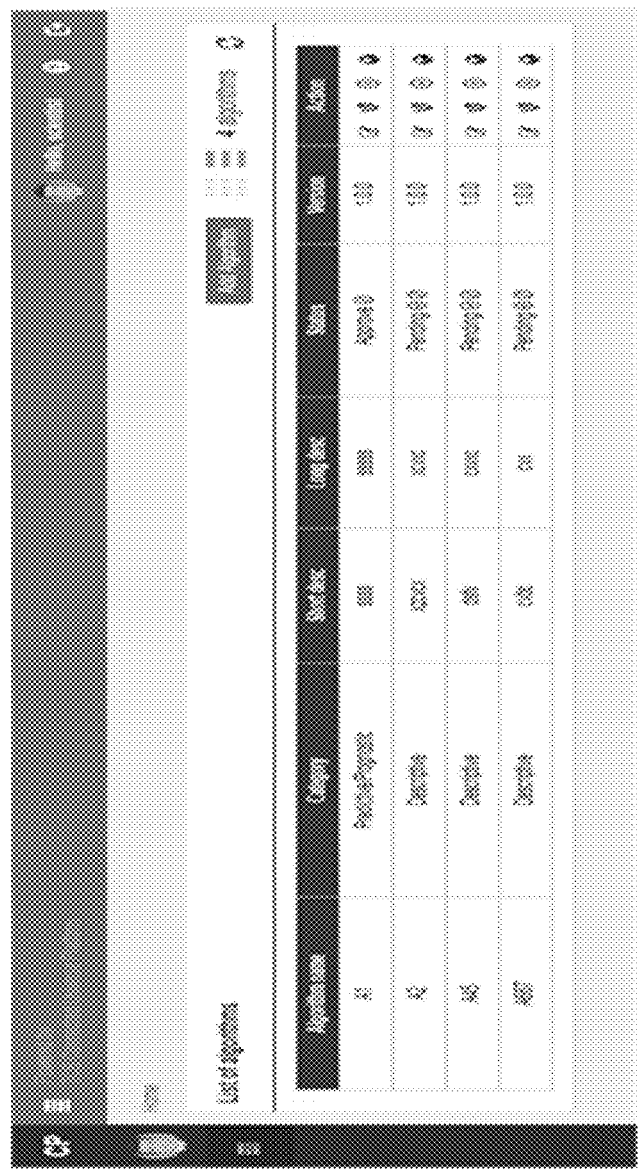
FIGS. 3, 4, 5, 6 and 7 are exemplary user interface views of cataloging technique depicting visualization of algorithms and associated metadata at different levels, in accordance with some embodiments of the present disclosure.

Experimental Results:

FIGS. 3 through 7 are exemplary user interface views of cataloging technique depicting visualization of algorithms and associated metadata at different levels, in accordance with some embodiments of the present disclosure. FIG. 3 depicts the visualization of a list of algorithms submitted by the first type of stakeholder (e.g., scientists, researchers, algorithm developers and the like.) As depicted in the FIG. 3, a set of algorithms (e.g., A1, A2, A45, A667) are submitted by the first type of stakeholder (e.g., scientists, researchers, an algorithm developer) for verification and a second type of stakeholder (e.g., admin) approval. As can be seen from the Table shown in FIG. 1, algorithm 'A1' is categorized as predictive or prognostic algorithm, and algorithms A2, A45, and A667 are categorized as descriptive algorithm. Further, a short and long description for each of the algorithm is provided. As can be seen in the table shown in FIG. 3, a short and long description of the submitted algorithms is provided. In an embodiment, the short and long description of algorithm can be further explained by way of a non-limiting example. For example, it is assumed that the algorithms submitted by the scientist from a particular domain is a compression algorithm. The short description provided for the compression algorithm could be "In this algorithm input time series data is initially partitioned into windows of a user defined window size (between 256 to 512 samples) and normalized using any method selected by the user out of the three methods provided by the system. Then that normalized window if compressed to a fixed length (180 dimensional) feature vector."

Similarly, the long description provided for the compression algorithm could be

"Edge based data compression is a prime requirement at the source before communicating it to cloud. Here a lossy compression method is applied using deep learning. This algorithm takes a time series window and compress it into a 180 dimensional vector. This algorithm can be applied on each window of size up to 512 samples and thus more than 50% compression can be achieved. The loss factor varies depending on the signal characteristic. In the present day FOG computing paradigm it is always preferable to extract the features in edge so that the communication bandwidth can be optimized. Moreover these features can be further applied for classification or regression problems."

Figure 4:
Figure 5:
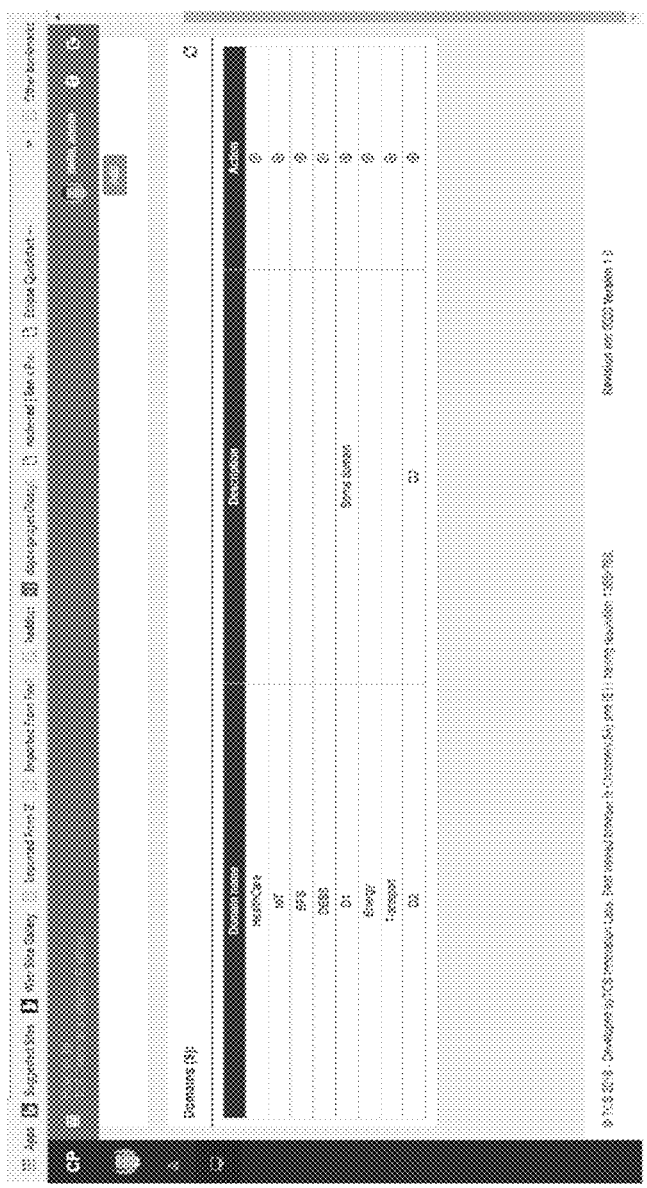
Figure 6:
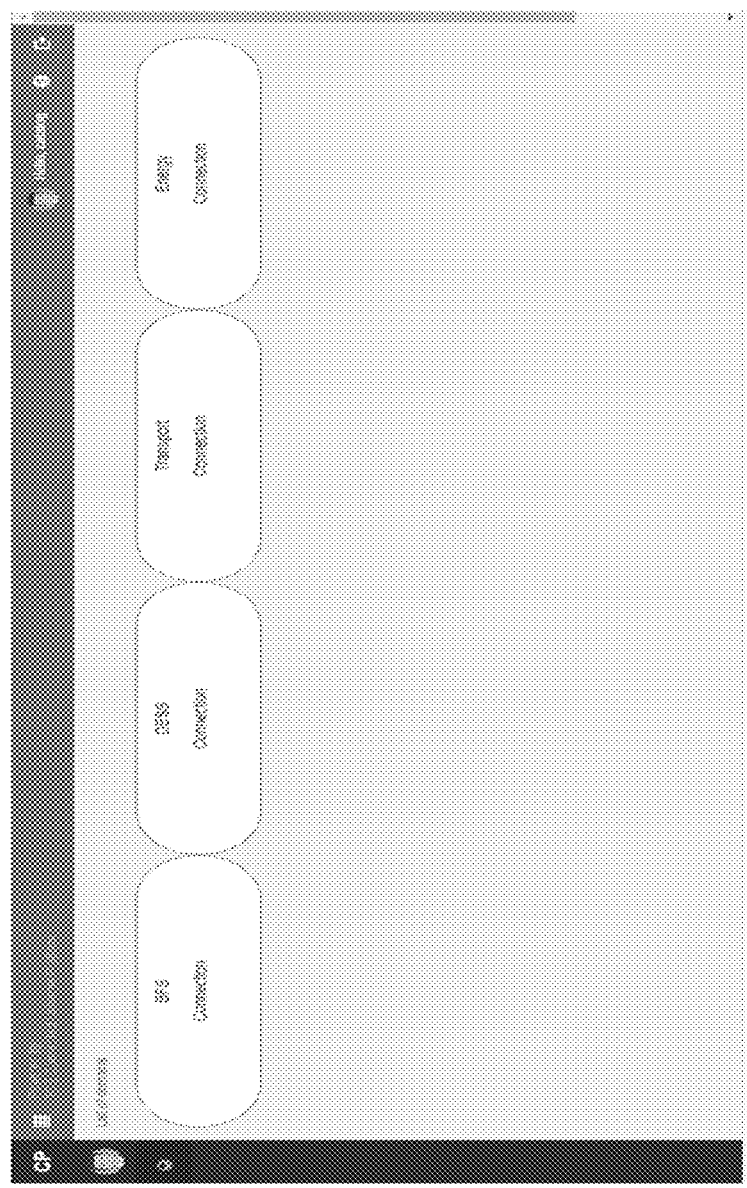
Figure 7:
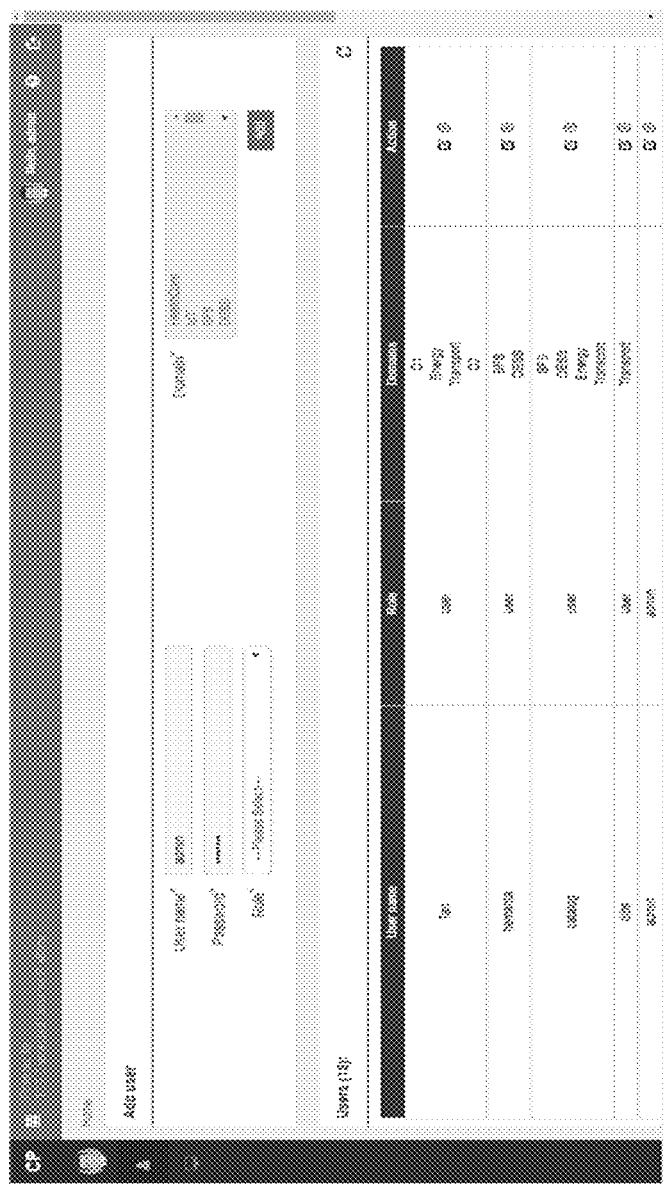

As depicted in FIG. 3, the verification status for the submitted algorithms is also shown with algorithm A1 having approved status and algorithms A2, A45, and A667 with a pending for approval status. Also, the version of the algorithm is mentioned in the Table. Here, version 1.0.0 indicates that the algorithm is not disapproved by admin and not yet sent back to scientist for further updation. In case the result of verification comes out to be negative, the admin disapproves the submitted algorithm and send it back to the respective scientist. The scientist further updates the algorithm and send another version of algorithm for admin approval. Table also comprises an action related information which includes an edit option, a version option, a delete option, and a domain option. As can be seen in FIG. 4, edit option helps in changing the input parameters, output parameters and other configurable parameters associated with the algorithms. Also, FIG. 4 depicts how hierarchy is defined in terms of category of the algorithm. Here, the type of category of algorithms could be but not limited to descriptive type, diagnostic type, predictive/prognostic type, prescriptive type, and generic type. The algorithms categorized as generic are the algorithms which are domain independent and can be viewed by all the users of all the domain. However, the algorithms categorized in any one the remaining categories (e.g., descriptive type, diagnostic type, predictive/prognostic type, prescriptive type) are domain specific algorithms and can only be viewed by user of the same domain. Further, as shown in FIG. 3, Version option helps in creating another version of the algorithm. Delete option helps in deleting the selected algorithm. Business domain option helps in linking the selected algorithm to a business domain. FIG. 5 provides the visualization of different domains created by the second type of stakeholder (e.g., Admin). As can be seen in FIG. 5, the domains created by the second type of stakeholder (e.g., Admin) include but not limited to healthcare, IoT, business finance services, transport, energy, D1, D2, and DESS. FIG. 6 provides a view of similar type of algorithms used by multiple domains (e.g., Business Finance services (BFS), DESS, transport, energy). FIG. 5 provides a view of the cataloging graphical interface which provides the visualization of how a user is created (alternatively referred as assigned) to a particular domain by the second type of stakeholder (e.g., Admin).

The illustrated steps of method 200 is set out to explain the exemplary embodiments shown, and it should be anticipated that ongoing technological development may change the manner in which particular functions are performed. These examples are presented herein for purposes of illustration, and not limitation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g.

an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for hierarchical dynamic cataloging,
the method comprising:
receiving a plurality of inputs and metadata associated with each of the plurality of inputs from one or more stakeholders pertaining to one or more applications, wherein
the plurality of inputs comprises algorithms, functions, source codes, configuration scripts, and domain knowledge;
tuning one or more hyper-parameters associated with the algorithms pertaining to the one or more applications;
generating a hierarchical structure of the plurality of inputs and the one or more stake holders pertaining to the one or more applications;
performing a mapping across the plurality of inputs received from the one or more stakeholders, based on the hierarchical structure to identify relationship between one or more components specified in one or more applications;
generating a catalog based on the identified relationship, wherein the catalog comprises a hierarchical listing of the algorithms with associated metadata developed for performing one or more tasks pertaining to the one or more applications in a specific domain;
receiving an incoming request from one or more users;
determining, based on the incoming request, a change in one or more attributes defining the hierarchical structure comprised in the catalog, wherein the one or more attributes includes the algorithms and the associated metadata, input parameters, output parameters, execution platforms, type of machine learning models, the functions, the source codes, and the configuration scripts; dynamically updating the catalog based on the change in one or more attributes defining the hierarchical structure and providing a dynamic view of the algorithms and the associated metadata, wherein the one or more components comprised in the hierarchical structure comprise a plurality of algorithms, a plurality of machine learning models, a plurality of execution platforms and information pertaining to one or more stakeholders, wherein the plurality of algorithms are structured in a hierarchy based on a layer of abstractions arranged in a chronological order, wherein the plurality of algorithms include one of a prescriptive algorithm, diagnostic algorithm, predictive algorithm and a prognostic algorithm, the prescriptive algorithm enables prediction for time of occurrence of a failure, the diagnostic algorithm depict step-by-step method for diagnosis using a combination of at least one of symptoms, signs, and test results, the predictive algorithms being used for predictions of future events and unknown events, and the prognostic algorithms assist in improving process of scheduling maintenance, ordering parts and using resources; and
enabling, based on the dynamically updated catalog, reusability of at least one of the plurality of inputs and the one or more components for the incoming request.

2. The processor implemented method of claim 1, further comprising providing a dynamic view of the algorithms and stakeholders by dynamically updating the catalog in case of any changes in the inputs and the relationship.

3. The processor implemented method of claim 1, further comprising creating a zero coding dynamic algorithm for an application by enabling reusability of a plurality of modules associated with other applications.

4. A system (100) for hierarchical dynamic cataloging, the system comprising:
a memory (102);
one or more communication interfaces (104); and
one or more hardware processors (106) coupled to said memory through said one or more communication interfaces, wherein said one or more hardware processors are configured to:
receive a plurality of inputs and metadata associated with each of the plurality of inputs from one or more stakeholders pertaining to one or more applications, wherein
the plurality of inputs comprises algorithms, functions, source codes, configuration scripts, and domain knowledge;
tune one or more hyper-parameters associated with the algorithms pertaining to the one or more applications;
generate a hierarchical structure of the plurality of inputs and the one or more stake holders pertaining to the one or more applications;
perform a mapping across the plurality of inputs received from the one or more stakeholders based on the hierarchical structure to identify relationship between one or more components specified in one or more applications;
generate a catalog based on the identified relationship, wherein the catalog comprises a hierarchical listing of the algorithms with associated metadata developed for performing one or more tasks pertaining to the one or more applications in a specific domain;
receive an incoming request from one or more users;
determine, based on the incoming request, a change in one or more attributes defining the hierarchical structure comprised in the catalog, wherein the one or more attributes includes the algorithms and the associated metadata, input parameters, output parameters, execution platforms, type of machine learning models, the functions, the source codes, and the configuration scripts;
dynamically update the catalog based on the change in one or more attributes defining the hierarchical structure and provide a dynamic view of the algorithms and the associated metadata, wherein the one or more components comprised in the hierarchical structure comprise a plurality of algorithms, a plurality of machine learning models, a plurality of execution platforms and information pertaining to one or more stakeholders, wherein the plurality of algorithms are structured in a hierarchy based on a layer of abstractions arranged in a chronological order, wherein the plurality of algorithms include one of a prescriptive algorithm, diagnostic algorithm, predictive algorithm and a prognostic algorithm, the prescriptive algorithm enables prediction for time of occurrence of a failure, the diagnostic algorithm depict step-by-step method for diagnosis using a combination of at least one of symptoms, signs, and test results, the predictive algorithms being used for predictions of future events and unknown events, and the prognostic algorithms assist in improving process of scheduling maintenance, ordering parts and using resources; and
enable, based on the dynamically updated catalog, reusability of at least one of the plurality of inputs and the one or more components for the incoming request.

5. The system of claim 4, wherein the one or more components comprised in the hierarchical structure comprise a plurality of algorithms, a plurality of machine learning models, a plurality of execution platforms and information pertaining to one or more stakeholders.

6. The system of claim 4, further configured to provide a dynamic view of the algorithms and stakeholders by dynamically updating the catalog in case of any changes in the inputs and the relationship.

7. The system of claim 4, further configured to create a zero coding dynamic algorithm for an application by enabling reusability of a plurality of modules associated with other applications.

8. One or more non-transitory machine readable information storage mediums comprising one or more instructions which when executed by one or more hardware processors cause
receiving a plurality of inputs and metadata associated with each of the plurality of inputs from one or more stakeholders pertaining to one or more applications, wherein
the plurality of inputs comprises algorithms, functions, source codes, configuration scripts, and domain knowledge;
tuning one or more hyper-parameters associated with the algorithms pertaining to the one or more applications;
generating a hierarchical structure of the plurality of inputs and the one or more stake holders pertaining to the one or more applications;
performing a mapping across the plurality of inputs received from the one or more stakeholders based on the hierarchical structure to identify relationship between one or more components specified in one or more applications;
generating a catalog based on the identified relationship, wherein the catalog comprises a hierarchical listing of the algorithms with associated metadata developed for performing one or more tasks pertaining to the one or more applications in a specific domain;
receiving an incoming request from one or more users;
determining, based on the incoming request, a change in one or more attributes defining the hierarchical structure comprised in the catalog, wherein the one or more attributes includes the algorithms and the associated metadata, input parameters, output parameters, execution platforms, type of machine learning models, the functions, the source codes, and the configuration scripts;
dynamically updating the catalog based on the change in one or more attributes defining the hierarchical structure and providing a dynamic view of the algorithms and the associated metadata, wherein the one or more components comprised in the hierarchical structure comprise a plurality of algorithms, a plurality of machine learning models, a plurality of execution platforms and information pertaining to one or more stakeholders, wherein the plurality of algorithms are structured in a hierarchy based on a layer of abstractions arranged in a chronological order, wherein the plurality of algorithms include one of a prescriptive algorithm, diagnostic algorithm, predictive algorithm and a prognostic algorithm, the prescriptive algorithm enables prediction for time of occurrence of a failure, the diagnostic algorithm depict step-by-step method for diagnosis using a combination of at least one of symptoms, signs, and test results, the predictive algorithms being used for predictions of future events and unknown events, and the prognostic algorithms assist in improving process of scheduling maintenance, ordering parts and using resources; and enabling, based on the dynamically updated catalog, reusability of at least one of the plurality of inputs and the one or more components for the incoming request.

9. The one or more non-transitory machine readable information storage mediums of claim 8, wherein the one or more components comprised in the hierarchical structure comprise a plurality of algorithms, a plurality of machine learning models, a plurality of execution platforms and information pertaining to one or more stakeholders.

10. The one or more non-transitory machine readable information storage mediums of claim 8, further configured to provide a dynamic view of the algorithms and stakeholders by dynamically updating the catalog in case of any changes in the inputs and the relationship.

11. The one or more non-transitory machine readable information storage mediums of claim 8, further configured to create a zero coding dynamic algorithm for an application by enabling reusability of a plurality of modules associated with other applications.

\* \* \* \* \*